Patented July 21, 1953

2,646,370

UNITED STATES PATENT OFFICE 2,646,370

METHOD OF MAKING LOW-TEMPERATURE METEOROLOGICAL BALLOONS

Eric Nelson, Madison, N. J., assignor to the United States of America as represented by the Secretary of the Army No Drawing. Application July 26, 1951,
Serial No. 238,767

2 Claims. (Cl. 117—94)

This invention relates to processes of improving the low temperature characteristics of hollow articles made of neoprene material, and more particularly to processes of improving the freeze resistance of meteorological, radiosonde, and emergency life-saving balloons made from neoprene or neoprene compounds and to the neoprene articles treated in accordance with these processes.

Meteorological balloons carrying recording instruments are relatively large and may expand during flight to about three to four times that of their low altitude diameter. Neoprene is being used to great advantage in the manufacture of such balloons and proves very satisfactory except for the fact that neoprene has insufficient low temperature characteristics so that balloons flown during the hours of darkness freeze, become brittle and therefore incapable of expansion. This occurs at altitudes considerably below those reached by similar balloons during daylight hours.

It is an object of this invention to improve the freeze resistance of neoprene balloons as a result of which the bursting altitude of neoprene balloons is raised to a level comparable with that achieved by similar balloons flown during daylight hours.

Briefly stated, the invention consists of incorporating a plasticizer in the neoprene film of the balloon after said film has been fully cured or vulcanized. The invention will become more apparent from the following description of distinct embodimentts of the broad inventive idea.

Properly compounded neoprene materials as used for the production of various types of inflatable balloons can withstand relatively low temperatures but become brittle and incapable of expansion at temperatures existing at very high altitudes during the hours of darkness.

It has been known in the art to employ softeners and plasticizers in order to improve the compounding and processing characteristics of neoprene. A wide variety of compounds including various esters of polybasic carboxylic acids such as phthalates, sebacate, adipates, etc., have been used for this purpose. Some of these plasticizers have also been proposed to satisfy the great need for imparting to the neoprene the desired low temperature flexibility. These plasticizers, however, also reduce the strength of the film and particularly the strength of the wet gel. This weakening of the gel imposes a limit to the amount of plasticizer which can be added to the compound.

I now have found that the plasticizer content may be increased above this limit, by a new technique of adding the plasticizer to the cured film. As an example, which in no way limits the present invention, the cured neoprene balloon is dipped in a solution of dibutyl sebacate in an organic solvent, e. g., alcohol. The balloon is subsequently removed from the solution, inflated and allowed to dry. By this means an additional quantity of plasticizer, over and above that which would be practically incorporated in the original compound, is absorbed by the film with a resultant lowering of the so-called brittle point, without impairing the mechanical strength of the film.

Although optimum results have been attained with dibutyl sebacate, other plasticizers may also be used such as triglycol dioctoate and polyethylene glycol di-2-ethylhexoate, which are sold by Carbide and Carbon Chemicals Corporation under the trade names of Flexol 3GO and Flexo 4GO. Other plasticizers of the same type, for example, dioctyl phthalate, dibutyl phthalate, etc., could also be used. As the solvent for the plasticizer denatured ethyl alcohol appears to be the most efficient and the most economic organic solvent for the purpose of the present invention. However, other solvents such as butyl alcohol and higher alcohols or acetone and some of the ketonic solvent could be used. The range of concentration of the solution may vary from 10% to as high as 70% of the plasticizer. Best results have been obtained with a solution of 20% of dibutyl sebacate in ethyl alcohol.

The hollow articles of neoprene materials made according to the present invention show a remarkable resistance to low temperatures, remain soft and flexible and possess great mechanical strength in spite of the additional amount of plasticizers incorporated into the neoprene film. Various modifications such as a combination of various plasticizers and various solvents for these plasticizers and also modifications as to the compounding of the neoprene with different vulcanizing agents, accelerators, anti-oxidants and the like will be apparent to those skilled in the art and are within the scope of the invention as defined by the appended claims.

What is claimed is:

1. A method of improving the freeze resistance of meteorological neoprene balloons which comprises applying to the surfaces of the fully cured and deflated neoprene balloon a solution of a plasticizer, compatible with neoprene, in an organic liquid medium which is a non-solvent for vulcanized neoprene, inflating said balloon and allowing the balloon to dry until said organic liquid medium has evaporated and the plasticizer has been absorbed by the neoprene film.

2. A method according to claim 1 in which the deflated neoprene balloon is dipped into a solution of about 20% of dibutyl sebacate in ethyl alcohol.

ERIC NELSON.

References Cited in the file of this patent

UNITED STATES PATENTS

| Number | Name | Date |
|---|---|---|
| 2,312,362 | Sarbach | Mar. 2, 1943 |
| 2,332,263 | Sarbach | Oct. 19, 1943 |
| 2,378,882 | Habib et al. | June 19, 1945 |
| 2,461,072 | Miller | Feb. 8, 1949 |
| 2,470,772 | Haas | May 24, 1949 |

OTHER REFERENCES

Du Pont's Pamphlet Bl. 94 of April 19, 1943, 11 pages.